United States Patent
Yoon

(10) Patent No.: US 10,288,440 B2
(45) Date of Patent: May 14, 2019

(54) APPARATUS AND METHOD FOR CALCULATING ROUTE IN CONSIDERATION OF VEHICLE DRIVING SITUATION

(71) Applicant: HYUNDAI MOTOR COMPANY, Seoul (KR)

(72) Inventor: Ji Hyun Yoon, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 7 days.

(21) Appl. No.: 15/259,329

(22) Filed: Sep. 8, 2016

(65) Prior Publication Data

US 2017/0322042 A1 Nov. 9, 2017

(30) Foreign Application Priority Data

May 3, 2016 (KR) .................. 10-2016-0054696

(51) Int. Cl.
*G01C 21/34* (2006.01)
*G01C 21/36* (2006.01)
*G08G 1/0968* (2006.01)

(52) U.S. Cl.
CPC ..... *G01C 21/3492* (2013.01); *G01C 21/3407* (2013.01); *G01C 21/3605* (2013.01);
(Continued)

(58) Field of Classification Search
CPC ............ G01C 21/3492; G01C 21/3605; G01C 21/3691; G08G 1/096844
See application file for complete search history.

(56) References Cited

U.S. PATENT DOCUMENTS

2007/0050133 A1* 3/2007 Yoshikawa ........ G01C 21/3461
701/437
2007/0106460 A1 5/2007 Nakayama et al.
(Continued)

FOREIGN PATENT DOCUMENTS

JP 2007-127419 A 5/2007
JP 2007-178357 A 7/2007
(Continued)

OTHER PUBLICATIONS

Korean Office Action dated Feb. 15, 2017 issued in Korean Patent Application No. 10-2016-0054696.
(Continued)

*Primary Examiner* — Michael D Lang
(74) *Attorney, Agent, or Firm* — Morgan Lewis & Bockius LLP

(57) ABSTRACT

An apparatus for calculating a route in consideration of a vehicular driving situation includes a situation recognizer determining whether a route is required to be calculated; a distance calculator calculating an estimated movement distance in consideration of a vehicle speed and a first estimated time required for searching for a route leading to a destination when the route is required to be calculated; and a route calculator calculating a future position of a vehicle to which the vehicle will have moved by the estimated movement distance along a lane in which the vehicle is driving or along an optimal route from a vehicle position at a first point in time when the situation recognizer determined the route was required to be calculated, and calculating an additional optimal route leading to the destination, based on the future position of the vehicle as a starting point.

12 Claims, 5 Drawing Sheets

(52) U.S. Cl.
CPC ..... *G01C 21/3617* (2013.01); *G01C 21/3691* (2013.01); *G08G 1/096844* (2013.01)

(56) References Cited

U.S. PATENT DOCUMENTS

| | | | |
|---|---|---|---|
| 2008/0091348 A1* | 4/2008 | Choi | G01C 21/3415 |
| | | | 701/414 |
| 2014/0222278 A1 | 8/2014 | Fujita | |
| 2014/0278052 A1 | 9/2014 | Slavin et al. | |
| 2015/0100158 A1 | 4/2015 | Tanigawa et al. | |

FOREIGN PATENT DOCUMENTS

| | | |
|---|---|---|
| JP | 2015-117956 A | 6/2015 |
| JP | 5807170 B2 | 11/2015 |
| KR | 10-1992-0006934 B1 | 8/1992 |
| KR | 10-2005-0058597 A | 6/2005 |
| KR | 10-2015-0128712 A | 11/2015 |
| WO | 2013/027803 A1 | 2/2013 |

OTHER PUBLICATIONS

Korean Office Action dated Jul. 28, 2017 issued in Korean Patent Application No. 10-2016-0054696.

\* cited by examiner

US 10,288,440 B2

APPARATUS AND METHOD FOR CALCULATING ROUTE IN CONSIDERATION OF VEHICLE DRIVING SITUATION

CROSS-REFERENCE TO RELATED APPLICATION

This application claims the benefit of priority to Korean Patent Application No. 10-2016-0054696, filed on May 3, 2016, in the Korean Intellectual Property Office, the entirety of which is incorporated herein by reference.

TECHNICAL FIELD

The present disclosure relates to a technique for providing a route leading to a destination, and more particularly, to an apparatus and method for calculating a route in consideration of a vehicular driving situation to provide a route leading to a destination set while a vehicle is being driven.

BACKGROUND

Existing traffic regulations do not permit a driver to operate a navigation device to set a destination while driving a vehicle. A destination may be changed or set, however, by an occupant of a passenger seat while the driver is driving, or the destination of a navigation device may be set by voice, or in the future, in an autonomous driving situation.

In a related art navigation device, a route leading to a destination is set on the basis of a position of a vehicle at a time when the destination is set, as a start point.

SUMMARY

The present disclosure has been made to solve the above-mentioned problems occurring in the prior art while advantages achieved by the prior art are maintained intact.

An aspect of the present disclosure provides an apparatus and method for calculating a route in consideration of a vehicular driving situation, capable of calculating a route in consideration of a vehicular driving situation when the route is required to be calculated, while a vehicle is driving.

Technical subjects of the present disclosure are not limited to the foregoing technical subjects and any other technical subjects not mentioned herein may be clearly understood by a person skilled in the art from the present disclosure described hereinafter.

According to an exemplary embodiment of the present disclosure, an apparatus for calculating a route in consideration of a vehicle driving situation includes: a situation recognizer determining whether a route is required to be calculated; a distance calculator calculating an estimated movement distance in consideration of a vehicle speed and a first estimated time required for searching for a route leading to a destination when the route is required to be calculated; and a route calculator calculating a future position of a vehicle to which the vehicle will have moved by the estimated movement distance along a lane in which the vehicle is driving or along an optimal route from a vehicle position at a first point in time when the situation recognizer determined the route was required to be calculated, and calculating an additional optimal route leading to the destination, based on the future position of the vehicle as a starting point.

According to another exemplary embodiment of the present disclosure, a method for calculating a route in consideration of a vehicular driving situation by at least one processor includes steps of: determining whether a route is required to be calculated; calculating an estimated movement distance in consideration of a vehicle speed and a first estimated time required for searching for a route leading to a destination when the route is required to be calculated; calculating a future position of a vehicle to which the vehicle will have moved by the estimated movement distance along a lane in which the vehicle is driving or along an optimal route from a vehicle position at a first point in time when it was determined that the route was required to be calculated; and calculating an additional optimal route leading to the destination based on the future position of the vehicle as a starting point.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

The advantages, features and aspects of the present invention will become apparent from the following description of the exemplary embodiments with reference to the accompanying drawings, which is set forth hereinafter. The present disclosure may, however, be embodied in different forms and should not be construed as limited to the exemplary embodiments set forth herein. Rather, these exemplary embodiments are provided so that this disclosure will be thorough and complete, and will fully convey the scope of the present disclosure to those skilled in the art. The terms used herein are for the purpose of describing particular exemplary embodiments only and are not intended to be limiting of exemplary embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments in the present disclosure will be described in detail with reference to the accompanying drawings.

Figure 1:
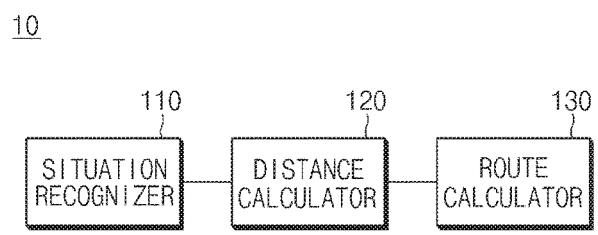
FIG. 1 is a block diagram of an apparatus for calculating a route in consideration of a vehicular driving situation according to an exemplary embodiment in the present disclosure.

FIG. 1 is a block diagram of an apparatus for calculating a route in consideration of a vehicle driving situation according to an exemplary embodiment in the present disclosure.

As illustrated in FIG. 1, an apparatus 10 for calculating a route (or a route calculating apparatus 10) in consideration of a vehicle driving situation includes a situation recognizer 110, a distance calculator 120, and a route calculator 130. The apparatus 10 for calculating a route in consideration of a vehicle driving situation according to an exemplary embodiment may be included in a mobile terminal in which a route guide application such as a T-MAP is installed or a navigation device.

The situation recognizer 110 recognizes whether it is a situation in which a route is required to be calculated. For example, the situation recognizer 110 may determine that it is a situation in which a route is required to be calculated when any one of the following cases is met:

When a driver newly sets a destination or changes a previously set destination;

When the driver deviates from a route leading to a destination;

When a vehicle deviates from a route leading to a destination due to various reasons (for example, failure to change lanes or an error in recognizing a position of an own vehicle (here, "own vehicle" refers to the vehicle of the driver)) during autonomous driving; and When a route is updated to a route in which an arrival time is earlier, by reflecting a traffic situation, or the like.

When in such a situation in which a route is required to be calculated, the distance calculator 120 calculates an estimated movement distance in consideration of a vehicle speed and a first estimated time required for searching for a route leading to the destination. Here, the first estimated time is an estimated time required for the route calculating apparatus 10 according to the present disclosure to search for a route, and may be experimentally set in consideration of a process rate of a processor.

For example, when a speed of an own vehicle is 60 km/h and the first estimated time is 3 seconds, the distance calculator 120 may calculate 50 meters (=(60,000 m/hr*3 sec)/3600 sec/hr) as an estimated movement distance.

Here, the distance calculator 120 may calculate the estimated movement distance in further consideration of a traffic situation of a road on which the own vehicle is driving, together with the vehicle speed.

The route calculator 130 calculates a future position of the vehicle to which the vehicle will have moved by the estimated movement distance along a lane in which the vehicle is driving or along an optimal route leading to the destination from the vehicle position at a first point in time at which the situation requiring calculation of a route was recognized.

Here, the route calculator 130 may set the future position of the vehicle in a different manner according to whether the optimal route is present.

In detail, when an optimal route leading to the destination is present, the route calculator 130 may calculate a position to which the vehicle will have moved by the estimated movement distance along the optimal route from the vehicle position at the first point in time, as a future position of the vehicle. For example, the optimal route may be present when a destination has been changed and set or when a route is required to be updated due to a change in a traffic situation, or the like, after the route leading to a destination is set.

When an optimal route is not present, the route calculator 130 may calculate a position to which the vehicle will have moved by the estimated movement distance along the lane in which the vehicle is driving from the vehicle position at the first point in time, as a future position of the vehicle. For example, an optimal route may not be present when a route leading to a destination is required to be calculated or when the vehicle deviates from a previously searched route.

Thereafter, the route calculator 130 calculates an additional optimal route leading to the destination, based on the future position of the vehicle as a starting point.

When a lane is required to be changed when the vehicle moves along the additional optimal route leading to the destination from the vehicle position at the first point in time, the route calculator 130 may calculate a future position of the vehicle and another optimal route in further consideration of a second estimated time required for changing the lane.

For example, the own vehicle may be driven in a first lane of a four-lane road, and a route may require that a driver turn right from a position 10 meters ahead to drive to a route leading to a destination. In the above case, however, it may be practically impossible for the own vehicle to completely change lanes from the first lane to the fourth lane within 10 meters and turn right. In the present disclosure, the route calculator 130 calculates a future position of the vehicle in consideration of the time required for changing lanes, that is, the time required for the vehicle to change lanes from the first lane to the fourth lane, and thus a future estimated movement route of the vehicle may be more accurately calculated.

Meanwhile, the apparatus 10 for calculating a route in consideration of a vehicular driving situation according to an exemplary embodiment of the present disclosure may further include an element for guiding the calculated route.

Also, the situation recognizer 110, the distance calculator 120, and the route calculator 130 described above may include at least one processor. Alternatively, the situation recognizer 110, the distance calculator 120, and the route calculator 130 may each be a component of at least one processor.

In this manner, in the exemplary embodiment of the present disclosure, since continuity is provided between a vehicular driving route and a searched route in consideration of a vehicle speed, a more effective optimal route leading to a destination may be provided.

In addition, a more effective route leading to a destination may be provided in consideration of a traffic situation or a lane change situation.

Figure 2A:
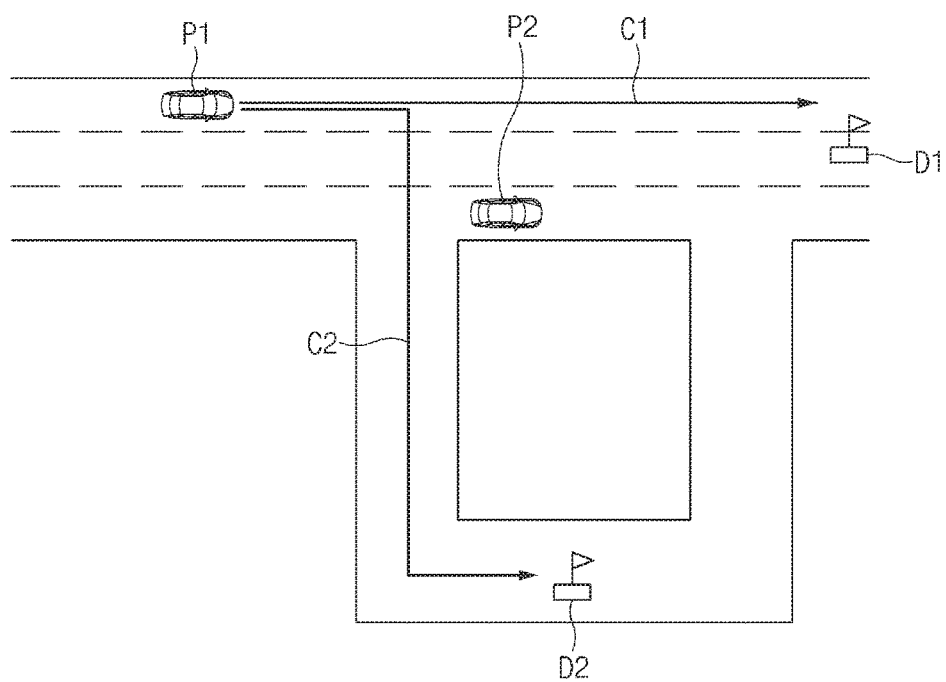
FIG. 2A is a view illustrating a route provided by a related art route calculating apparatus.
Figure 2B:
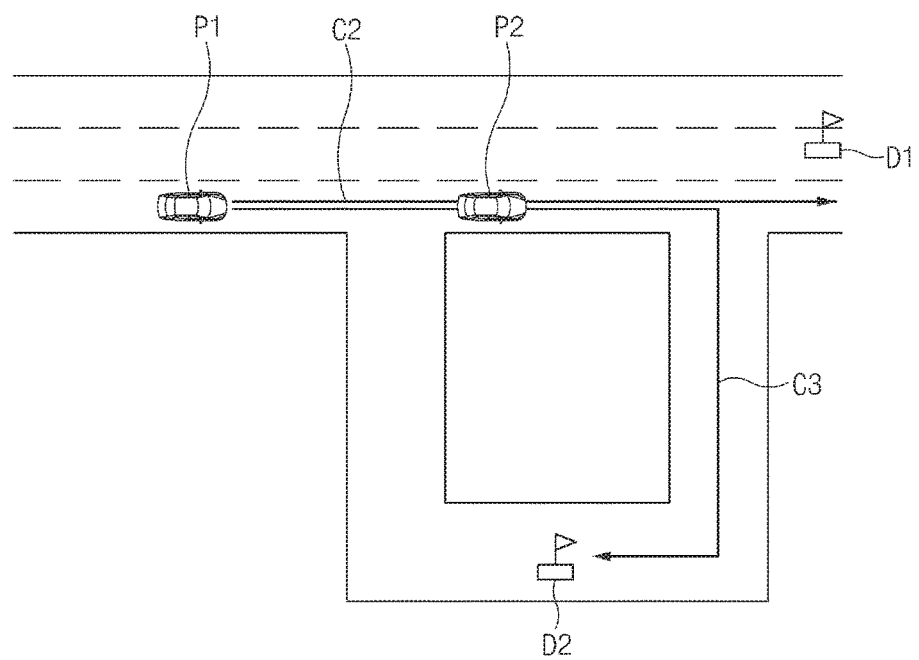
FIGS. 2B and 2C are views illustrating a route provided by an apparatus for calculating a route in consideration of a vehicle driving situation according to an exemplary embodiment in the present disclosure.
Figure 2C:
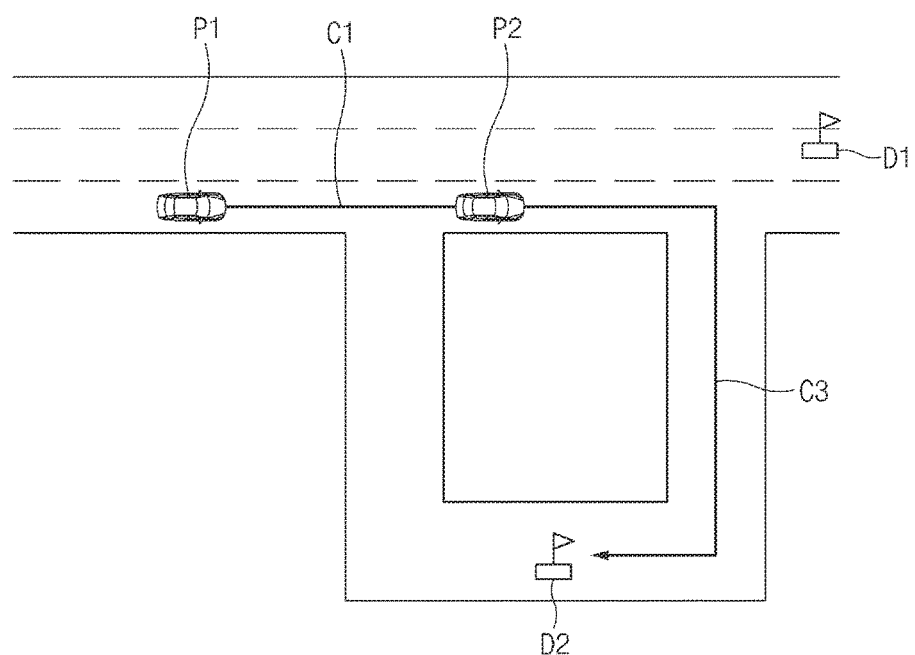

Hereinafter, a comparison of routes provided by the related art route calculating apparatus and the route calculating apparatus according to an exemplary embodiment of the present disclosure when a destination is changed and set will be described with reference to FIGS. 2A to 2C. FIG. 2A is a view illustrating a route provided by a related art route calculating apparatus, and FIGS. 2B and 2C are views illustrating a route provided by an apparatus for calculating a route in consideration of a vehicular driving situation according to an exemplary embodiment in the present disclosure. In FIGS. 2A to 2C, a point D1 is an existing destination and a point D2 is a new destination.

As illustrated in FIG. 2A, when a destination is changed from D1 to D2 and set, the related art route calculating apparatus generates a new route C2 leading to the new destination D2, based on a position P1 of the own vehicle at a first point in time as a starting point. Here, however, in order for the own vehicle driving in the first lane along the existing route C1 to turn right, the own vehicle should change the lane to the third lane, and thus, at a second point in time at which the own vehicle is provided with the route leading to the new destination, the own vehicle is already placed at a position P2 deviating from the new route C2. In this manner, since the related art route calculating apparatus generates a route without consideration of a time required for the own vehicle to change a lane. Therefore, there is a possibility of an accident due to a rapid change in the lanes in a case of autonomous driving or a problem in which the own vehicle has already deviated from the searched route at a point in time (the second point in time) at which the new route is provided, even when the driver manually drives the vehicle.

In contrast, as illustrated in FIGS. 2B and 2C, the route calculating apparatus 10 according to the present disclosure provides a route leading to a new destination on the basis of a future position of the own vehicle, solving the problem.

In detail, as illustrated in FIG. 2B, when a previously calculated existing route C2 is present, the route calculating apparatus 10 according to the present disclosure calculates a future position P2 of the own vehicle on the assumption that the own vehicle drives along the existing route C2 from the vehicle position P1 at a first point in time. Also, the route calculating apparatus 10 according to the present disclosure calculates a new route (C2=route leading to D2 from P2) leading to the new destination D2 from the calculated future position P2 of the own vehicle.

As illustrated in FIG. 2C, when there is no previously calculated existing route, the route calculating apparatus 10 according to the present disclosure calculates the future position P2 of the own vehicle on the assumption (C1) that the own vehicle is driving along the lane in which the own vehicle is currently driving from the vehicle position P1 at the first point in time. Also, the route calculating apparatus 10 according to the present disclosure calculates a new route (C3=a route leading to D2 from P2) leading to the new destination D2 from the calculated future position P2 of the own vehicle.

In this manner, in the present disclosure, since the route is calculated in consideration of the vehicular driving situation (a speed, a traffic situation, and a driving lane) and the route calculation time, as well as the current position of the vehicle, a more effective optimal route may be guided.

Figure 3:
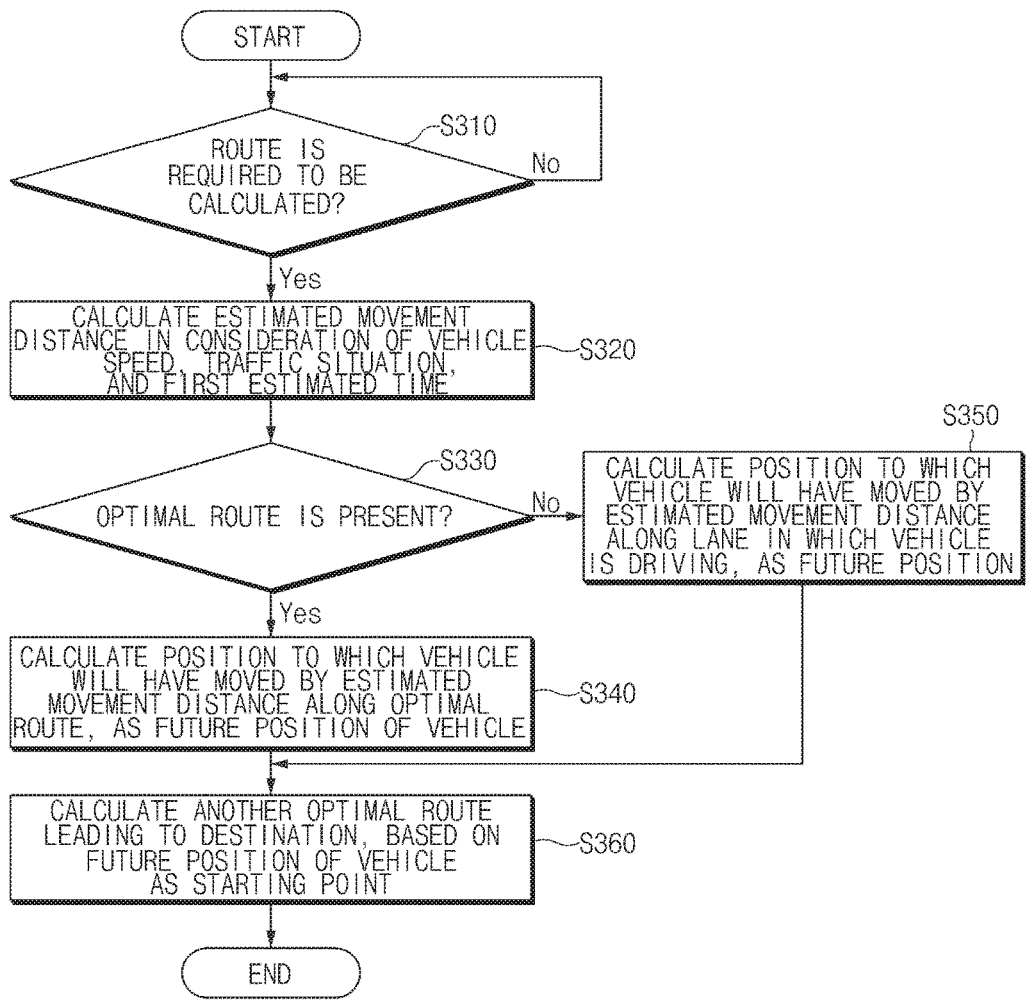
FIG. 3 is a flow chart illustrating a method for calculating a route in consideration of a vehicle driving situation according to an exemplary embodiment of the present disclosure.

Hereinafter, a method for calculating a route in consideration of a vehicular driving situation according to an exemplary embodiment in the present disclosure will be described with reference to FIG. 3. FIG. 3 is a flow chart illustrating a method for calculating a route in consideration of a vehicular driving situation according to an exemplary embodiment.

Referring to FIG. 3, the situation recognizer 110 recognizes whether a route is required to be calculated in the current situation in operation S310. When it is determined that it is a situation in which a route is required to be calculated, the situation recognizer 110 informs the distance calculator 120 accordingly.

The distance calculator 120 calculates an estimated movement distance in consideration of a vehicle speed, a traffic situation of a road, and a first estimated time required for searching for a route leading to a destination in operation S320.

When the situation is one in which a route is required to be calculated, the route calculator 130 determines whether there is an optimal route leading to the destination in operation S330.

When there is an optimal route according to the determination result, the route calculator 130 calculates a position to which the vehicle will have moved by the estimated movement distance from a vehicle position at a first point in time along the optimal route, as a future position of the vehicle, in operation S340.

When there is no optimal route, however, the route calculator 130 calculates a position to which the vehicle will have moved by the estimated movement distance along the lane in which the vehicle is driving from the vehicle position at the first point in time, as a future position of the vehicle in operation S350.

The route calculator 130 calculates an additional optimal route leading to the destination from the future position of the vehicle as a starting point in operation S360.

Here, the route calculator 130 determines whether it is necessary for the vehicle to change lanes when the vehicle moves along the additional optimal route leading to the destination from the vehicle position at the first point in time. When it is necessary to change lanes, the route calculator 130 may calculate a future position and another optimal route for the vehicle in further configuration of a second estimated time required for changing the lane.

In this manner, in the present disclosure, since the route is calculated in consideration of the vehicular driving situation (speed, traffic situation, and driving lane) and the route calculation time, as well as the current position of the vehicle, a more effective optimal route may be guided.

As described above, according to the present disclosure, a route leading to a destination may be calculated in consideration of a driving situation of a vehicle and provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for calculating a route in consideration of a vehicular driving situation, the apparatus comprising:
   a situation recognizer determining whether a route is required to be calculated;
   a distance calculator calculating an estimated movement distance in consideration of a vehicle speed, a traffic situation of a road on which a vehicle is driving, and a driving lane of the vehicle, and calculating a first estimated time required for searching for a route leading to a destination when the route is required to be calculated; and
   a route calculator calculating a future position of the vehicle to which the vehicle will have moved by the estimated movement distance along a lane in which the vehicle is driving or along an optimal route from a vehicle position at a first point in time when the situation recognizer determined the route was required to be calculated, and calculating an additional optimal route leading to the destination based on the future position of the vehicle as a starting point,
   wherein the route calculator calculates the future position of the vehicle by using the first estimated time and a second estimated time required for changing one or more lanes in a current driving direction when the additional optimal route leading to the destination from the vehicle position at the first point in time requires the vehicle to change the one or more lanes in the current driving direction.

2. The apparatus according to claim 1, wherein
   the situation recognizer determines whether a current situation corresponds to at least one of:
   a case in which a driver has set the destination or has changed the set destination,
   a case in which the vehicle that the driver is manually driving or that is autonomously driving has deviated from the optimal route, and a case in which the optimal route has been updated to a route in which an arrival time is earlier in consideration of a traffic situation.

3. The apparatus according to claim 1, wherein the distance calculator calculates the estimated movement distance in further consideration of a traffic situation of a road on which the vehicle is driving, together with the vehicle speed.

4. The apparatus according to claim 1, wherein the route calculator sets the future position of the vehicle to be different according to whether the optimal route is present.

5. The apparatus according to claim 4, wherein the route calculator calculates a position to which the vehicle will have moved by the estimated movement distance along the optimal route from the vehicle position at the first point in time as the future position of the vehicle when the optimal route is present.

6. The apparatus according to claim 4, wherein the route calculator calculates a position to which the vehicle will have moved by the estimated movement distance along the lane in which the vehicle is driving from the vehicle position at the first point in time as the future position of the vehicle when the optimal route is not present.

7. A method for calculating a route in consideration of a vehicular driving situation by at least one processor, the method comprising steps of:
   determining whether a route is required to be calculated;
   calculating an estimated movement distance in consideration of a vehicle speed, a traffic situation of a road on which a vehicle is driving, and a driving lane of the vehicle, and calculating a first estimated time required for searching for a route leading to a destination when the route is required to be calculated;
   calculating a future position of the vehicle to which the vehicle will have moved by the estimated movement distance along a lane in which the vehicle is driving or along an optimal route from a vehicle position at a first point in time when it was determined that the route was required to be calculated; and
   calculating an additional optimal route leading to the destination based on the future position of the vehicle as a starting point,
   wherein the step of calculating the additional optimal route includes:
      determining whether lanes are required to be changed when the vehicle moves along the additional optimal route from the vehicle position at the first point in time; and
      calculating the future position of the vehicle by using the first estimated time and a second estimated time required for changing one or more lanes in a current driving direction when the one or more lanes are required to be changed in the current driving direction.

8. The method according to claim 7, wherein the step of determining whether the route is required to be calculated corresponds to at least one of:
   a case in which a driver has set the destination or has changed the set destination,
   a case in which the vehicle that the driver is manually driving or that is autonomously driving has deviated from the optimal route, and
   a case in which the optimal route has been updated to a route in which an arrival time is earlier in consideration of a traffic situation.

9. The method according to claim 7, wherein the step of calculating the estimated movement distance includes calculating the estimated movement distance in further consideration of a traffic situation of a road on which the vehicle is driving, together with the vehicle speed.

10. The method according to claim 7, wherein the step of calculating the additional optimal route includes steps of:
    determining whether the optimal route is present; and
    setting the future position of the vehicle to be different according to whether the optimal route is present.

11. The method according to claim 10, wherein the step of setting the future position of the vehicle to be different includes calculating a position to which the vehicle will have moved by the estimated movement distance along the optimal route from the vehicle position at the first point in time as the future position of the vehicle when the optimal route is present.

12. The method according to claim 10, wherein the step of setting the future position of the vehicle to be different includes calculating a position to which the vehicle will have moved by the estimated movement distance along the lane in which the vehicle is driving from the vehicle position at the first point in time as the future position of the vehicle when the optimal route is not present.

* * * * *